United States Patent [19]

Wiese et al.

[11] Patent Number: 5,055,136

[45] Date of Patent: Oct. 8, 1991

[54] HEAT-STABLE IRON OXIDE BLACK PIGMENTS, PROCESSES FOR THEIR PRODUCTION AND THEIR USE

[75] Inventors: Jürgen Wiese; Gunter Buxbaum; Peter Kresse, all of Krefeld, Fed. Rep. of Germany

[73] Assignee: Bayer Aktiengesellschaft, Leverkusen, Fed. Rep. of Germany

[21] Appl. No.: 365,839

[22] Filed: Jun. 14, 1989

[30] Foreign Application Priority Data

Jun. 24, 1988 [DE] Fed. Rep. of Germany ....... 3821341

[51] Int. Cl.$^5$ ................................................ C09C 1/22
[52] U.S. Cl. ..................................... 106/456; 106/499
[58] Field of Search ................................ 106/456, 499

[56] References Cited

U.S. PATENT DOCUMENTS

| | | | |
|---|---|---|---|
| 3,036,889 | 5/1962 | Frey | 106/456 |
| 3,533,820 | 10/1970 | Lewis et al. | 106/456 |
| 3,867,516 | 2/1975 | Bodson | 106/456 |
| 4,123,501 | 10/1978 | Köhler et al. | 106/456 |
| 4,631,089 | 12/1986 | Rademachers et al. | 106/456 |
| 4,701,221 | 10/1987 | Brunn et al. | 106/456 |

FOREIGN PATENT DOCUMENTS 1337392 9/1987 U.S.S.R. .

OTHER PUBLICATIONS

Patent Abstracts of Japan, vol. 2, No. 18 (C-78) (1013), Jun. 28, 1978 for JP-A 5 335 697.

*Primary Examiner*—William R. Dixon, Jr.
*Assistant Examiner*—Willie Thompson
*Attorney, Agent, or Firm*—Connolly and Hutz

[57] ABSTRACT

A heat-stable iron oxide black pigment resistant to hydrothermal treatment in air at temperatures above 180° C. and which has a specific BET surface of 0.5 to 5 m$^2$/g is useful as a coloring agent for building materials, paints, cements, bricks and so forth and is prepared by reacting an aqueous solution of FeOOH, iron (II) salts and alkalis at elevated temperature and precipitating iron oxide from the solution with Na$_2$CO$_3$ at temperatures in the range from 80° C. to the boiling point of the solution.

10 Claims, No Drawings

HEAT-STABLE IRON OXIDE BLACK PIGMENTS, PROCESSES FOR THEIR PRODUCTION AND THEIR USE

This invention relates to new heat-stable iron oxide black pigments, to processes for their production and to their use.

BACKGROUND OF THE INVENTION

Pigments based on magnetite ($Fe_3O_4$) having particle sizes in the range from 0.1 to 2.0 µm are used for a wide range of applications. As black pigments, they are used for coloring building materials and lacquers. Their magnetic properties are utilized in one-component toners for photocopiers. Their heat resistance is generally judged to be adequate. However, where they are used in building materials which harden under hydrothermal conditions, they undergo a change in color to red or brown.

Pigments having the narrowest possible particle size distribution are generally required to obtain optimal properties.

Accordingly, the production of such pigments is an important development target. The general processes by which pigments of the type in question can be produced have been adequately described.

Thus, DE-A 900 257 describes the so-called precipitation process in which iron(II) salts are reacted with atmospheric oxygen in the presence of alkalis to form $Fe_3O_4$ pigments.

Another variant is the two-step precipitation process. In this process, which is described in U.S. Pat. No. 2,631,085, an iron(III) oxide or iron(III) hydroxide is reacted with iron(II) salts with addition of alkalis to form magnetite pigments.

However, the heat resistance of these pigments is inadequate, so that hitherto it has only been possible to use expensive mixed-phase pigments, such as for example metal (II)-containing ferrites (for example copper-manganese ferrites).

$Fe_3O_4$ pigments having very good color properties can be produced by the two-step process. Pigments such as these are also distinguished by a narrow particle size distribution.

Magnetite ($Fe_3O_4$) crystallizes in the cubic system with a spinel structure in the structure type $O_h7$. Development of the crystal faces (100) leads to cubic crystals and, of the (111) crystal faces, to the octahedral forms which have hitherto been observed among the magnetite pigments. With irregular shaped pigments particles, there is no development of a defined crystal face.

The object of the present invention is to provide iron oxide black pigments which do not undergo any change of color in the production of steam-hardened building materials such as for example, lime-sand bricks or fiber-reinforced cement.

BRIEF DESCRIPTION OF THE INVENTION

It has now surprisingly been found that, using $Na_2CO_3$ as the precipitant and precipitation temperatures of from 80° C. to the boiling point or $NaOH/Na_2CO_3$ mixtures as precipitant, it is possible by the two-step precipitation process to obtain iron oxide black pigments which, in the absence of further measures, withstand the necessary autoclave treatment without changing color.

DETAILED DESCRIPTION OF THE INVENTION

The present invention relates to heat-stable iron oxide black pigments and the process for production of such pigments.

These pigments show the desired black color tinged with blue and have a low specific surface of approximately 0.5 to 5 $m^2/g$ combined with good dispersibility.

Accordingly, the present invention relates to heat-stable iron oxide black pigments which are resistant to hydrothermal treatment in air at temperatures above 180° C. and which have a specific BET surface, as determined by the nitrogen method (DIN 66 131), of 0.5 to 5 $m^2/g$.

The invention also relates to a process for the production of the iron oxide black pigments according to the invention.

$Na_2CO_3$ solution or mixtures of $Na_2CO_3$ and NaOH are added to a suspension of α-FeOOH in an iron salt solution until precipitation of the iron salts is complete, followed by stirring at the reaction temperature of 70° C. to the boiling point until the reaction is complete. The pH value is then adjusted to values above 8.5 by addition of more sodium hydroxide, followed by stirring for a time.

After working up in the usual way (filtration, washing and drying), the pigments obtained are incorporated in fiber-reinforced cement which is then treated in an autoclave for 8 hours at 180° C./8 bar or for 4 hours at 204° C./16 bar. The pigmenting level is 5%. The formulations are described in H. Gundlach, "Dampfgehärtete Baustoffe (Steam-Hardened Building Materials)", Wiesbaden-Berlin, 1973, pages 229 et seq. The hardened fiber-reinforced cement blocks were visually assessed.

EXAMPLE 1

39 l of a suspension of α-FeOOH (55 g/l) in an aqueous $FeSO_4$ solution (53 g/l), $Fe^{III}:Fe^{II}$ ratio 1.8, are heated with stirring (800 r.p.m.) to 90° C. under inert conditions ($N_2$) in a 60 liter stirred vessel, followed by the addition over a period of 10 minutes of the quantity of $Na_2CO_3$ required for precipitation (6.9 l; 210 g/l). After stirring for 5 hours, the pH value is adjusted to pH 9.5 with sodium hydroxide (400 g/l), followed by stirring for another 4 hours. The consumption of NaOH is 1.1 l. The vessel is then opened and its contents stirred for 1 hour in the absence of nitrogen.

After filtration and washing, the product is dried at 40° C.

The magnetite obtained is cube-shaped with chamfered edges.

Particle size: 1.5 µm.
Specific surface (BET): 1.2 $m^2/g$.

EXAMPLE 2

40 l of a suspension of α-FeOOH (53 g/l) in an aqueous $FeSO_4$ solution (50 g/l), $Fe^{III}:Fe^{II}$ ratio 1.8, are heated with stirring (800 r.p.m.) to 70° C. under inert conditions ($N_2$) in a 30 liter stirred vessel, followed by the addition over a period of 8 minutes of the quantity of a mixture of $Na_2CO_3$ and NaOH in the form of an aqueous solution required for precipitation (3400 ml; 207 g/l: 2600 ml; 206 g/l).

The mixture is then heated at 90° C. in 60 minutes and stirred for 4 hours.

The apparatus is then opened and its contents stirred for 1 hour in the absence of nitrogen.

After filtration and washing, the product is dried at 40° C.

The magnetite obtained is transitional between cubic and rhombododecahedral in shape.

Particle size: 0.5 μm.
Specific surface (BET): 3.0 m²/g.

EXAMPLE 3A

Fiber-reinforced cement blocks were produced using the magnetite pigment of Example 1 and hardened for 8 h at 180° C./8 bar.

EXAMPLE 3B

Fiber-reinforced cement blocks were produced using the magnetite pigment of Example 2 and hardened for 8 h at 204° C./16 bar.

COMPARISON EXAMPLE 1A

Fiber-reinforced cement blocks were produced using a commercially available blue-tinged iron oxide black pigment (Bayferrox ® 306, a product of Bayer AG) and hardened for 8 h at 80° C./8 bar.

COMPARISON EXAMPLE 1B

Fiber-reinforced cement blocks produced using the same pigment as in Comparison Example 1a were hardened for 4 h at 204° C./16 bar.

| Example | Visual color impression |
| --- | --- |
| 3a | Deep black |
| 3b | Deep black |
| Comp. 1a | Brown-black |
| Comp. 1b | Brown |

What is claimed is:

1. A heat-stable iron oxide black pigment resistant to hydrothermal treatment in air at temperatures above 180° C. and which has a specific BET surface of 0.5 to 5 m²/g.

2. A process for the production of heat-stable iron oxide black pigment resistant to hydrothermal treatment in air at temperatures above 180° C. and which has a specific BET surface of 0.5 to 5m²/g which comprises reacting an aqueous solution of FeOOH, iron(II) salts and alkalis at elevated temperature and precipitating iron oxide from the solution with $Na_2CO_3$ at temperatures in the range from 80° C. to the boiling point of the solution.

3. A process for the production of heat-stable iron oxide black pigments according to claim 2 wherein after said reaction, the pH value of the reaction mixture is raised to above 8.5 and the mixture is subjected to a post-reaction under reaction conditions for 1 to 10 hours.

4. A process for the production of heat-stable iron oxide black pigments according to claim 2 wherein sodium carbonate is in the form of $Na_2CO_3$-containing alkali metal hydroxide.

5. A process for the production of heat-stable iron oxide black pigments according to claim 4 wherein after the reaction the pH value of the reaction mixture is raised to above 8.5 and the mixture is subject to a post-reaction under reaction conditions for 1 to 10 hours.

6. Heat-stable iron oxide black pigment prepared by the process according to claim 2.

7. Colored building materials containing a color imparting amount of the iron-oxide black pigment according to claim 1.

8. Colored paint containing a color imparting amount of the iron-oxide black pigment according to claim 1.

9. Colored fiber-reinforced cement containing a color imparting amount of the iron-oxide black pigment according to claim 1.

10. Colored lime-sand bricks containing a color imparting amount of the iron-oxide black pigment according to claim 1.

* * * * *